United States Patent [19]
Hatton

[11] 3,876,915
[45] Apr. 8, 1975

[54] ELECTRICAL COIL FORM WITH CAPACITOR-HOLDING MEANS

[75] Inventor: Richard L. Hatton, Barrington, Ill.

[73] Assignee: Precision Paper Tube Company, Wheeling, Ill.

[22] Filed: Sept. 7, 1973

[21] Appl. No.: 394,990

[52] U.S. Cl. .......................................... 317/157.62
[51] Int. Cl. ............................................ H01f 27/40
[58] Field of Search .......... 317/157.62; 336/90, 105

[56] References Cited
UNITED STATES PATENTS

| | | | |
|---|---|---|---|
| 2,181,982 | 12/1939 | Tarzian | 317/157.62 |
| 2,206,261 | 7/1940 | O'Callaghan | 317/157.62 |
| 2,435,630 | 2/1948 | Ketcham | 317/157.62 |
| 2,569,687 | 10/1951 | Pan | 317/157.62 |

Primary Examiner—L. T. Hix

[57] ABSTRACT

An integrally molded plastic coil form includes a tubular body and a pair of spaced-apart capacitor-attaching lugs which extend outwardly from the body transversely to the axis thereof. Each lug includes a shoulder which is spaced from the body and which extends toward the other lug for holding a capacitor between the shoulder and the body, and each shoulder is provided with an outer camming surface extending away from the other lug to permit the capacitor to be inserted between the lugs by pressing the capacitor against the camming surfaces to separate the shoulders sufficiently to insert the capacitor. A coil may be wound about the coil form, and the capacitor and the coil can be connected to an electric circuit.

4 Claims, 6 Drawing Figures

PATENTED APR 8 1975 3,876,915

ELECTRICAL COIL FORM WITH CAPACITOR-HOLDING MEANS

BACKGROUND AND SUMMARY

Many circuits require an inductance, such as a coil, and such inductances are conveniently provided by winding an electrically conductive wire around a tubular coil form to provide a coil. It is often desirable to include a capacitance in the same circuit as the inductance, and at times, it is convenient to provide the inductance and the capacitance as a combined component which can be connected to the electrical circuit. For example, in the past a combination inductance and capacitance in which the capacitance was connected in parallel to the inductance has been provided by winding a coil on a coil form and attaching the leads of the coil to electrically conductive lugs on the coil form. The lugs facilitate connecting the coil to a circuit, as by plugging the conductive lugs into an appropriate socket, and a capacitor was also connected to the lugs so that the coil and capacitor are connected in parallel. However, the capacitor was mounted on the coil form only by the leads of the capacitor which were secured to the conductor lugs, and such mounting is relatively insecure. As a result, the capacitor might inadvertently become detached if excessive stress were created on the capacitor leads, and, even if the leads were not severed, any desired physical spacing between the capacitor and the coil would be difficult to maintain.

The invention provides a coil form which provides a firm mechanical securement for the capacitor to relieve stresses on the capacitor leads and to maintain a constant physical relationship between the capacitor and the coil. The capacitor is retained between a pair of attaching lugs which are molded integrally with a plastic coil form, and the attaching lugs include shoulders which extend toward each other to firmly retain the capacitor against the body of the coil form. The outer surfaces of the shoulders extend away from each other to permit the capacitor to be inserted between the attaching lugs merely by pressing the capacitor against the inclined surfaces to cam the attaching lugs away from each other. The attaching lugs are sufficiently flexible to permit this camming action, and are sufficiently resilient to return into holding engagement with the capacitor as the capacitor passes inwardly beyond the shoulders. The attaching lugs not only securely anchor the capacitor after the capacitor is connected to the coil, but the securement of the capacitor facilitates connecting the capacitor leads to the leads of the coil. The spacing between the attaching lugs may be selected relative to the size of the capacitor to provide sufficient frictional retention force to prevent the capacitor from being inadvertently withdrawn axially from between the attaching lugs. However, if for some reason it is desired to change the capacitor, the capacitor can be withdrawn after the leads are severed merely by pulling the capacitor from between the attaching lugs. If desired, the frictional engagement between the attaching lugs and the capacitor can be reduced or eliminated by spreading the attaching lugs slightly while the capacitor is being withdrawn.

DESCRIPTION OF THE DRAWING

The invention will be explained in conjunction with an illustrative embodiment, in which.

DESCRIPTION OF SPECIFIC EMBODIMENT

Figure 1:
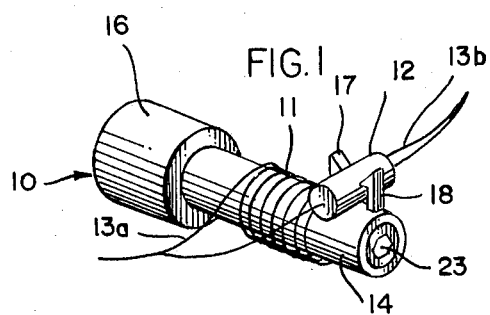
FIG. 1 is a perspective view of an electrical circuit component comprising a coil wound about a coil form and a capacitor mounted on the coil form.
Figure 2:
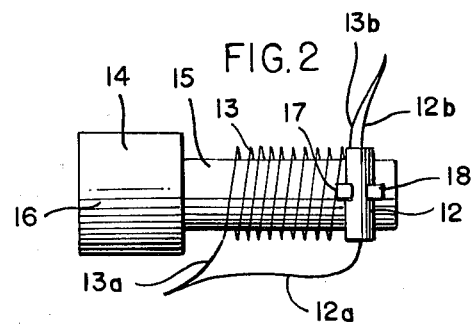
FIG. 2 is a top plan view of the electrical circuit component of FIG. 1.

Referring now to the drawing, the numeral 10 designates generally an electrical circuit component which comprises a coil 11 and a capacitor 12. The coil is provided by winding a wire 13 around a coil form 14 to form a helically wound coil having a pair of leads 13a and 13b. The capacitor 12 includes a pair of conductive wire leads 12a and 12b, and in the embodiment illustrated the capacitor is connected in parallel to the coil by connecting the leads 12a and 13a and the leads 12b and 13b. The combined inductance and capacitance can be connected to a circuit by connecting the combined leads 12a–13a and 12b–13b to the circuit.

The coil form 14 includes an elongated tubular body portion 15 and an enlarged base portion 16 which can be used to mount the coil form on a chassis or circuit board. In the embodiment illustrated the tubular body 15 is cylindrical, and the base portion 16 is also cylindrical and concentric with the body portion. However, the coil form can have other cross sectional configurations, such as that of a square or other polygon.

A pair of elongated attaching lugs 17 and 18 extend laterally outwardly from the outer surface of the body of the coil form adjacent the outer end thereof, and the lugs extend transversely to the longitudinal axis of the coil form. Each of the attaching lugs includes a straight leg portion 19 and an outer or shoulder portion 20 which has a shoulder 21 extending toward the other attaching lug to reduce the spacing between the lugs. Each outer portion includes an outer camming surface 22 which extends angularly outwardly away from the other lug.

If desired, a tuning core 23 of powdered iron or the like can be threadedly engaged with the inner surface of the coil form to vary the electrical characteristics of the coil.

Figure 4:
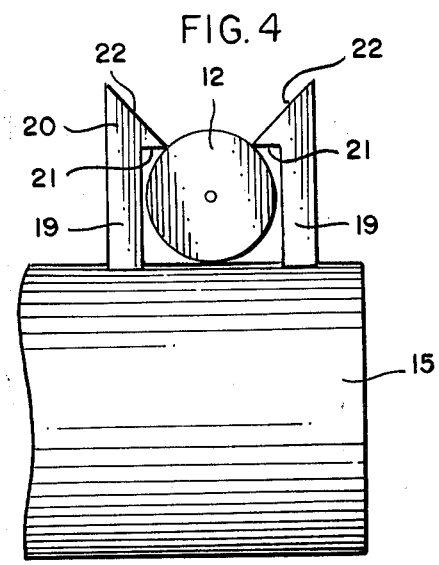
FIG. 4 is a view similar to FIG. 3 showing the capacitor secured by the attaching lugs.
Figure 5:
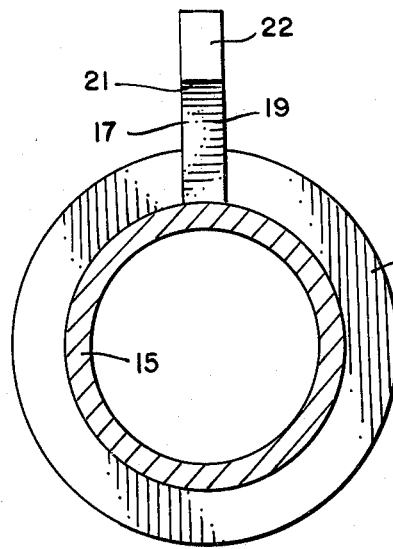
FIG. 5 is a sectional view taken along the line 5—5 of FIG. 3.

The spacing between the leg portions 19 of the attaching lugs is selected to accommodate the size of the capacitor 12, and the spacing between the shoulders and the outer surface of the coil form body is such that the shoulders will hold the capacitor against the coil form body. In one specific embodiment of the invention, a capacitor having an outside diameter of 0.125 inch was used. The spacing between the leg portions 19 was 0.130 inch, and the shoulders 21 were spaced 0.115 inch from the outer surface of the coil form body. The minimum spacing between the shoulders before the capacitor was inserted was 0.090 inch, and the thickness of the lugs, i.e., the dimension extending transversely to the axis of the coil form, was 0.030 inch. Although the spacing between the leg portions 19 was greater than the diameter of the capacitor, the capacitor was frictionally retained between the attaching lugs by virtue of the force exerted by the shoulders, which held the capacitor against the body of the coil form as illustrated in FIG. 4.

Figure 3:
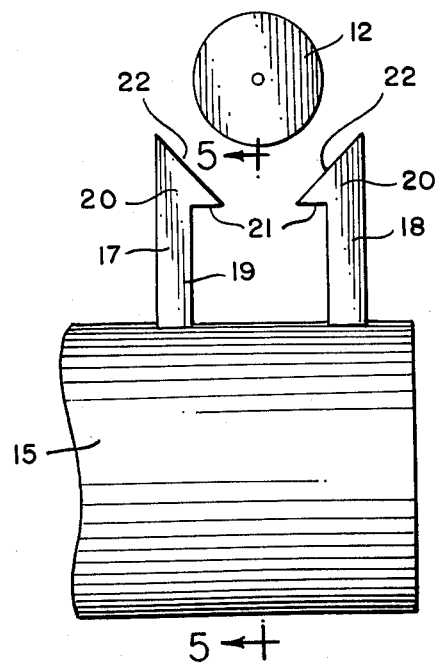
FIG. 3 is an enlarged fragmentary side view of the coil form of FIG. 1 showing a capacitor about to be inserted between the attaching lugs.

The coil form and the attaching lugs are advantageously integrally molded from plastic, and the plastic material and the dimension of the leg portions 19 in the longitudinal direction of the coil form is such that the attaching lugs can be flexed slightly away from each other to permit the capacitor to be pushed downwardly past the shoulders. The capacitor is inserted by pushing the capacitor downwardly against the outer camming surfaces 22, and the lugs will therefore flex outwardly until the widest portion of the capacitor passes the shoulders. The material and thickness of the attaching lugs is such that the attaching lugs have sufficient resilience to return toward their original positions illustrated in FIG. 3 after the capacitor passes the shoulders, and the capacitor is thereby retained between the shoulders and the outer surface of the coil form body.

Figure 6:
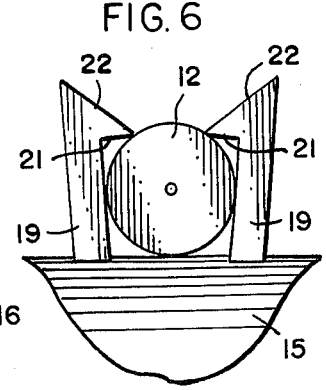
FIG. 6 is a view similar to FIG. 4 showing a modified coil form.

If desired, additional frictional engagement between the attaching lugs and the capacitor can be provided by spacing the leg portions of the attaching legs slightly less than the diameter of the capacitor so that the leg portions also engage the capacitor when the capacitor is inserted between the attaching lugs. This is illustrated in FIG. 6 in which the legs 19 engage the capacitor 12.

The capacitor can be secured between the attaching lugs either before or after the coil 13 is wound, and the securement of the capacitor by the attaching lugs facilitates the connection of the capacitor leads to the coil leads.

After the capacitor leads are attached to the coil leads, the combination inductance and capacitance can be handled as an integrated electrical component, and the attaching lugs will prevent inadvertent detachment of the capacitor from the coil form and the coil. If a specific spacing is desired between the capacitor and the coil, the attaching lugs will also ensure the maintenance of the desired spacing.

The attaching lugs provide a releasable engagement on the capacitor if it is desired to change capacitors for any reason. The capacitor is retained between the attaching lugs by frictional engagement, and the capacitor can be removed by pulling the capacitor in the axial direction of the capacitor with sufficient force to overcome the frictional engagement. Withdrawal of the capacitor can be facilitated by spreading the attaching lugs slightly as the capacitor is pulled, and the capacitor can be pulled with one hand while the attaching lugs are spread with the fingers of the other hand.

While in the foregoing specification a detailed description of a specific embodiment of the invention was set forth for the purpose of illustration, it is to be understood that many of the details hereingiven may be varied considerably by those skilled in the art without departing from the spirit and scope of the invention.

I claim:

1. An electrical circuit component comprising an elongated tubular coil form, a wire wound about the coil form to form an electrical coil, a pair of spaced-apart attaching lugs extending transversely outwardly from the coil form, each of the lugs including a shoulder portion spaced outwardly from the coil form and extending toward the other lug, and a capacitor held by the attaching lugs between the shoulders and the coil form.

2. The structure of claim 1 in which the spacing between the spaced-apart legs is less than the diameter of the capacitor.

3. The structure of claim 1 in which the shoulder portion of each lug includes an outer camming surface extending away from the other lug whereby the capacitor can be inserted between the lugs by pressing the capacitor against the camming surfaces to flex the lugs apart sufficiently to permit the capacitor to pass between the shoulder portions, the lugs being sufficiently flexible to permit the shoulder portions to be spread apart at least as much as the diameter of the capacitor, the lugs resiliently returning toward each other after said flexing to engage the capacitor.

4. The structure of claim 3 in which the coil form and the attaching lugs are molded integrally from plastic.

* * * * *